(12) United States Patent
Avidan et al.

(10) Patent No.: US 7,373,012 B2
(45) Date of Patent: May 13, 2008

(54) DETECTING MOVING OBJECTS IN VIDEOS WITH CORNER-BASED BACKGROUND MODEL

(75) Inventors: Shmuel Avidan, Brookline, MA (US); Qiang Zhu, Goleta, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 647 days.

(21) Appl. No.: 11/048,536

(22) Filed: Feb. 1, 2005

(65) Prior Publication Data

US 2006/0171594 A1 Aug. 3, 2006

(51) Int. Cl.
*G06K 9/40* (2006.01)
(52) U.S. Cl. ..................................... 382/260
(58) Field of Classification Search ............... 348/342; 382/210, 260, 261, 278
See application file for complete search history.

(56) References Cited

OTHER PUBLICATIONS

C. Harris and M. Stephens, "A combined corner and edge detector", Fourth Alvey Vision Conference, pp. 147-151, 1988.*
D.G.Lowe. Object recognition from local scale invariant features,, ICCV'99, Sep. 1999.*
C.R. Wren, A. Azarbayejani, T.J. Darrell, and A.P. Pentland, "Pfinder: Real-time tracking of the human body", PAMI, 19(7):780-785, Jul. 1997.
N. Friedman and S. Russell, "Image segmentation in video sequences: A probabilistic approach", In Thirteenth Conference on Uncertainty in Artificial Intelligence (UAI), Aug. 1997.
W.E.L. Grimson, C. Stauffer, R. Romano, and L. Lee, "Using adaptive tracking to classify and monitor activities in a site", In CVPR'98, CA, 1998.
Elgammal, D. Harwood, L. S. Davis, "Non-parametric model for background subtraction", ECCV'00. Dublin, Ireland, Jun./Jul. 2000.
Anurag Mittal, Nikos Paragios, "Motion-based background subtraction using adaptive kernel density estimation", CVPR'04 vol. 2 Jun. 27-Jul. 2, 2004 Washington, DC, USA. pp. 302-309.
Dieter Koller, Joseph Weber, and Jitendra Malik, "Robust multiple car tracking with occlusion reasoning", ECCV'94, Stockholm, Sweden, May 1994.
K. Toyama, J. Krumm, B. Brumitt, and B. Meyers. "Wallflower: Principles and practice of background maintenance". ICCV'99, Greece, Sep. 1999.
G. Doretto A. Chiuso, S. Soatto, Y.N. Wu, "Dynamic textures", IJCV 51(2):91-109, 2003.
Antoine Monnet, Anurag Mittal, Nikos Paragios, Visvanathan Ramesh, "Background modeling and subtraction of dynamic scenes", ICCV'03, Oct. 13-16, 2003 Nice, France. p. 1305.

(Continued)

*Primary Examiner*—Matthew C. Bella
*Assistant Examiner*—Greg F. Cunningham
(74) *Attorney, Agent, or Firm*—Dirk Brinkman; Clifton D. Mueller; Gene V. VinoVur

(57) ABSTRACT

A computer implemented method models a background in a sequence of frames of a video. For each frame, the method detects static corners using an array of pixels of the frame, and extracts, for each static corner, features from a window of pixels around the static corner. For each static corner, a descriptor is determined from the corresponding features. Each static corner and corresponding descriptor is stored in a memory, and each static corner is classified as a background or foreground according to the descriptor to model a background in the video.

16 Claims, 2 Drawing Sheets

OTHER PUBLICATIONS

Jing Zhong and Stan Sclaroff, "Segmenting foreground objects from a dynamic textured background via a robust Kalman Filter", ICCV'03, pp. 44-50, 2003.

M. Harville, "A framework for high-level feedback to adaptive, per-pixel, Mixture-of-Gaussian background models", ECCV'02, vol. 3, pp. 543-560, Copenhagen, Denmark, May 2002.

K. Mikolajczyk, C. Schmid, "A performance evaluation of local descriptors", CVPR'03, Jun. 18-20, 2003, Madison, Wisconsin, pp. 257-265.

D.G.Lowe. "Object recognition from local scale invariant features", ICCV'99, Sep. 1999.

J. Davis and G. Bradski, "Real-time Motion Template Gradients using Intel CVLib", IEEE ICCV Workshop on Frame-rate Vision, Sep. 1999.

* cited by examiner

DETECTING MOVING OBJECTS IN VIDEOS WITH CORNER-BASED BACKGROUND MODEL

FIELD OF THE INVENTION

This invention relates generally to video processing, and more particularly to modeling backgrounds and detecting objects in videos.

BACKGROUND OF THE INVENTION

Many computer vision and video surveillance applications seek to identify moving objects, for example, pedestrians, vehicles, or events of interest in different environments. Typically, the detection of unusual motion is performed first. Motion detection distinguishes moving 'foreground' objects in an otherwise normally static 'background.' This stage is often referred to as 'foreground detection' or 'background subtraction'. A number of techniques are known that use different types of background models that update the models at a pixel level.

Over time, the intensity value of an individual pixel in a static background usually follows a normal distribution. Hence, a reasonable model to represent such a statistical distribution is a single Gaussian model, C. R. Wren, A. Azarbayejani, T. J. Darrell, and A. P. Pentland, "Pfinder: Real-time tracking of the human body," PAMI, 19(7), pp. 780-785, July 1997.

Often, a single Gaussian model is inadequate to accurately model the temporal changes of a pixel intensity value in a dynamic background, such as a background with changing shadows due to changes in lighting conditions. The use of multiple models to describe dynamic backgrounds at the pixel level was a breakthrough in background modeling. Specifically, methods employing a mixture of Gaussian distributions have become a popular basis for a large number of related techniques in recent years.

A mixture of three Gaussian components can be used to model visual properties of each pixel, N. Friedman and S. Russell, "Image segmentation in video sequences: A probabilistic approach," Thirteenth Conference on Uncertainty in Artificial Intelligence, August 1997. That model also uses an expectation-maximization (EM) process to learn the Gaussian Mixture Model (GMM) over time. In a target traffic surveillance application, the intensity value of each pixel is restricted to three hypotheses: road, shadow, and vehicles. Unfortunately, that simple assumption significantly degrades the ability of the GMM to model arbitrary distributions for individual pixels. Moreover, that method is computationally expensive.

Another technique models each pixel as a mixture of Gaussian distributions with a variable number of Gaussian components, W. E. L. Grimson, C. Stauffer, R. Romano, and L. Lee, "Using adaptive tracking to classify and monitor activities in a site," CVPR'98, 1998. Those models can be updates in real-time using approximations. That video surveillance system has been proven robust for day and night cycles, and for scene changes over long periods of time. However, for backgrounds that exhibit very rapid variations, such as ripples on water, ocean waves, or moving grass and trees, that model can result in a distribution with a large variance over a long video sequence. Thus, the sensitivity for detecting foreground objects is reduced significantly.

To address such challenging situations, non-parametric techniques have been developed. Those techniques use kernel densities to estimate background properties at each pixel, based on multiple recently acquired samples. Those techniques can adapt to rapid background changes, Elgammal, D. Harwood, L. S. Davis, "Non-parametric model for background subtraction," ECCV 2000, June 2000. That method uses a normal kernel function for density estimation. The model represents a history of recent sample values over a long video sequence.

Another similar technique emphasizes a variable bandwidth kernel for the purpose of adaptive density estimation. As another feature, an optical flow can be used, Anurag Mittal, Nikos Paragios, "Motion-based background subtraction using adaptive kernel density estimation," CVPR 2004, Volume 2, pp. 302-309, June, 2004.

Other techniques that deal with effective background modeling can be categorized as predictive methods. Predictive methods treat pixel intensity changes as a time series and use a temporal model to predict a next pixel value, based on past observations. The deviation between the predicted value and the actual observation can be used to adjust the parameters of the predictive model.

Other methods use filters. For example, a Kalman-filter can model the dynamic properties of each pixel, Dieter Koller, Joseph Weber, and Jitendra Malik, "Robust multiple car tracking with occlusion reasoning," ECCV'94, May 1994. A simple version of the Kalman-filter, e.g., the Weiner filter, can make probabilistic predictions based on a recent history of pixel intensity values.

An autoregressive model captures properties of dynamic scenes for the purpose of similar textures simulation, G. Doretto A. Chiuso, S. Soatto, Y. N. Wu, "Dynamic textures," IJCV 51(2), pp. 91-109, 2003. That method was improved to address the modeling of dynamic backgrounds and to perform foreground detection in video surveillance, Antoine Monnet, Anurag Mittal, Nikos Paragios, Visvanathan Ramesh, "Background modeling and subtraction of dynamic scenes," ICCV'03, p. 1305, October, 2003, and Jing Zhong and Stan Sclaroff, "Segmenting foreground objects from a dynamic textured background via a robust Kalman Filter," ICCV'03, pp. 44-50, 2003. Although good results have been obtained for some challenging sample video, the computation cost of using such an autoregressive model is high.

In general, pixel-level background modeling suffers from two major disadvantages. First, the computational complexity of those models is inherently high. Every pixel must be processed in each video frame. In many challenging dynamic scenes, a number of different frequency components demand a model with many Gaussian distributions or a highly complicated predictive model to precisely capture the recurrent patterns of motion at a single pixel over time. The performance trade-off between detection accuracy and computation cost is always a hard decision in choosing a pixel-level background model.

Secondly, the intensity value at individual pixels is very easily affected by noise. In essence, what is lacking in pixel-level models is some higher-level information, which is more robust and can be derived from regions in the frame or even from the entire frame.

One method attempts to guide the pixel-level mixture of a Gaussian model by incorporating feedback from high-level modules, M. Harville, "A framework for high-level feedback to adaptive, per-pixel, Mixture-of-Gaussian Gaussian background models," ECCV'02, vol. 3, pp. 543-560, May 2002. However, the basis of that framework is still a pixel-level background model.

Therefore, there is a need for a background modeling that considers high-level information in a video.

SUMMARY OF THE INVENTION

The invention provides a corner-based background model. The method according to the invention distinguishes and detects actual moving objects from time-varying backgrounds, such as ripples on water, trees waving in the wind, and changes in lighting.

In principle, the method has three steps. For each video frame, corners are detected using a Harris corner-detector. Then, within a local window around each corner, a number of features are extracted. The features identify and describe the corner. A dynamic background model is constructed and maintained from the features.

The model classifies each corner as being either background or foreground. In addition, a spatial and temporal correlation can be used to reduce the number of foreground corners that are classified incorrectly.

The corner-based background model according to the invention achieves a higher accuracy in detecting foreground objects than prior art pixel-based background models. Furthermore, videos can be processed at a higher frame rate than for methods that use conventional pixel-level models.

DETAILED DESCRIPTION OF THE PREFERRED EMBODIMENT

Figure 1:
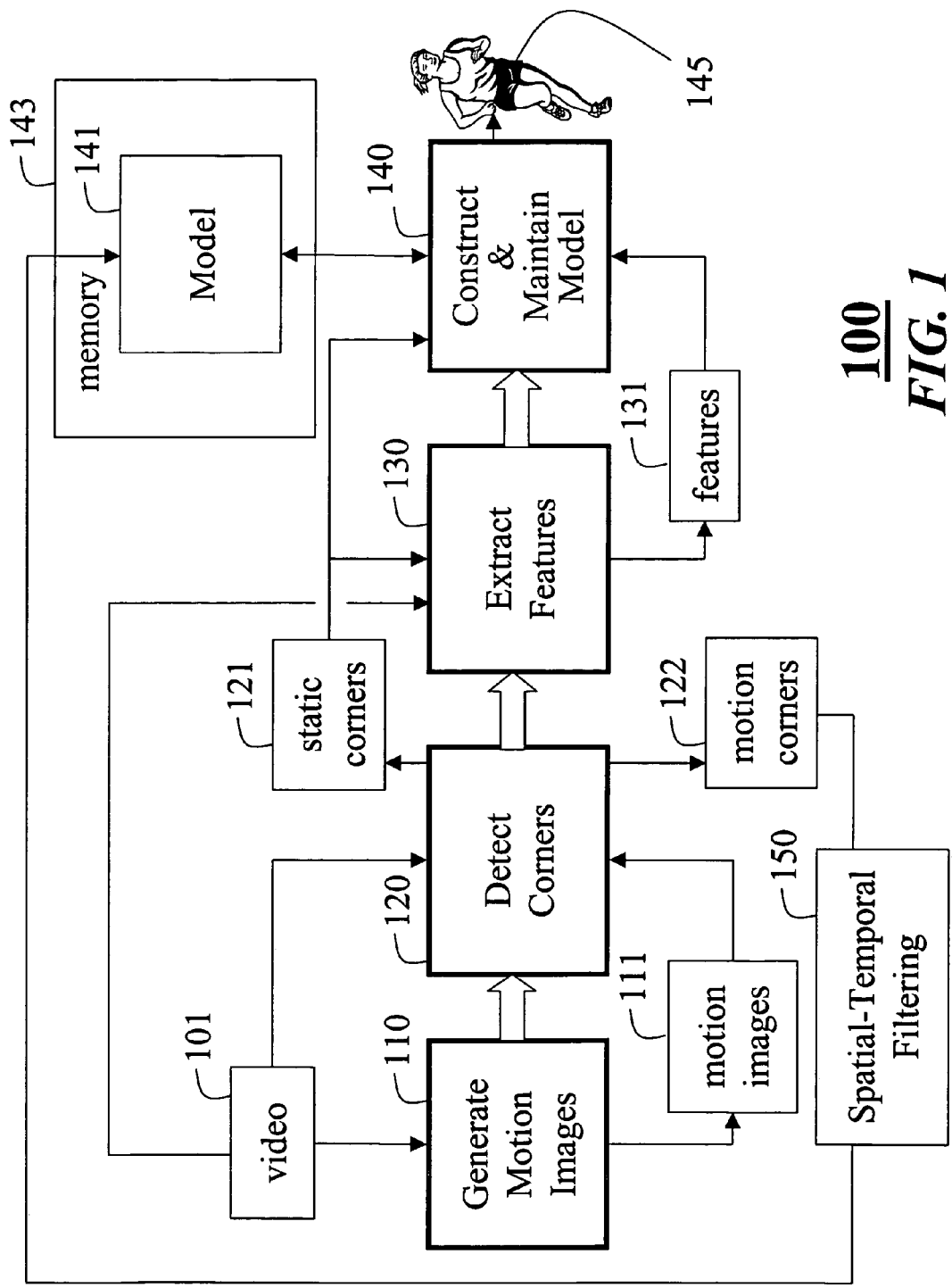
FIG. 1 is a flow diagram of a method for generating a corner-based background model according to the invention.

As shown in FIG. 1, a computer implemented method 100 according to the invention provides a method 100 for modeling a background in a sequence of frames in a video 101. The model can be used to detect a moving object 145 in a video.

The method generates 110 motion images 111 from consecutive pairs of frames. Corners 121-122 are detected 120 in video frames and motion images. The corners are detected by a process that is an enhancement of a Harris corner detector, C. Harris and M. Stephens, "A combined corner and edge detector," Fourth Alvey Vision Conference, pp. 147-151, 1988, incorporated herein by reference.

From a local window of neighborhood pixels around each static corner 121, extract 130 features 131. The features 131 and static corners 121 are used to construct and maintain 140 a model 141 stored in a memory 143 of a computer system. The model classifies each static corner 121 as either a background or foreground corner. The classified corners constitute the background model according to the invention.

In addition, spatial and temporal filtering 150 according to the motion corners 122 are used reduce the number of foreground corners that are identified incorrectly. Thus, the method provides a high-level background model, not based on all of the input pixels, but instead based on a small number of corners. Hence, the background model 141 is very sparse compared with prior art pixel-based background models.

Corner Detection

Corner detection is an important task in various vision applications including motion-tracking, object-recognition, and stereo-matching. Two specific issues need to be addressed in order to be able to apply corner detection to background modeling and motion detection: extracted features corresponding to the static background regions must be consistent over time; and the computation cost must be minimized to meet the performance requirement for real-time applications, and reasonable frame rates, e.g., greater than 30 frames-per-second (fps).

Definition of Harris Corner Detector

A matrix, $$M = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial y}\right)^2 \end{bmatrix}, \quad (1)$$

where I(x, y) is an intensity image, specifies a local auto-correlation from image gradients within a sub-window in a pixel intensity image. If the two eigenvalues of the matrix M at a local point are large, then a corner is detected. For a 2×2 matrix M, a corner response function can be defined for more efficient computation to replace the more time consuming eigenvalues calculation, as follows:

$$R = \det(M) - k \times (\operatorname{trace}(M))^2, \quad (2)$$

where det is the determinant of the matrix M, k is a parameter, e.g., 0.04, and a trace of a square matrix is the sum of diagonal elements. Corners are identified as local maxima of the values R of Equation (2). A sub-pixel precision technique can refine the location of the corner.

Detecting Corners with Motion Information

Corners in a single frame capture only static information. For video applications, a natural way to capture motion information is to extend the conventional 2D-image corner detector to a 3D, spatial-temporal corner detector. Such an extension, although possible, is impractical for real-time applications because the eigenvalues calculation of a 3×3 matrix over each pixel location is extremely time-consuming.

Therefore, the invention provides an efficient way to detect corners that capture both static and motion information, but at a considerably lower computation cost than the conventional Harris corner detector.

Specially, motion images 111 are generated 110. Each motion images 111 is a difference between two consecutive frames in the input video 101. Then, the 2D Harris corner-detector is applied 120 to each motion image 111 to also detect the motion corners 122. Each motion corner identified in the motion images 111 indicates a location in each frame with significant motion. It should be noted that the prior art only detects static corners 121.

The method applies the following heuristics to detect the motion corners 122. The threshold value R of Equation (2) can be adjusted to limit the number of detected motion corners 122. For some scenes, a large number of 'strong' motion corners can be located within a small region. A minimum distance between any pair of neighboring motion corners can be enforced to prevent detecting too many corners within a small region. In principle, each motion corner implies a potential foreground object, which needs to be further verified. The verification is done using the corner-based background model.

The preferred embodiment, where a resolution of each frame is 352×240, retains about ~200-300 static corners 121 for each frame and about 10~30 motion corners 122 for each motion image. The minimum distance is restricted to five pixels between any two static corners, and fifteen pixels between any two motion corners.

In most images of natural scenes, static corners appear in areas with rich textures and edges, such as moving leaves and a building. For homogenous features, such as the sky and the road, few static corners occur. The corners are used to construct and maintain 140 the high-level background model 141, which, in turn, can be used to classify all corners detected in the current frame into two categories: background or foreground.

Because the number of moving objects in the foreground is usually small for most video surveillance applications, the method 100 only retains a small number of motion corners 122 that correspond to the strongest motion areas.

The key advantage of the corner-based model over pixel-level models is the substantial savings in computation cost for the processes of building and maintaining the model 141. For a 352×240-resolution video sequence, about 100,000 pixels are processed in each frame when a pixel-level background model is used. For the corner-based background model, only ~200-300 corners need be considered.

Local Descriptor of Corners

A descriptor for each corner helps accurate corner identification and classification of corners. Stable local-feature representation is a fundamental component of many computer vision applications, such as object-recognition and pattern matching. Ideally, a descriptor of a corner should reliably distinguish one corner of interest from other corners. The descriptor should be precise, and insensitive to small shifts and illumination changes.

A number of descriptors are described by D. G. Lowe, "Object recognition from local scale invariant features", ICCV'99, September 1999. The scale invariant feature transform (SIFT) has the best performance and is insensitive to common image deformations. A SIFT descriptor is based on a histogram representation of image gradient orientations in a local neighborhood.

Specifically, a 4×4 grid of histograms, each with eight orientation bins, effectively encodes a rough spatial structure of an image patch around a corner. The resulting 128-dimensional vector is then normalized to unit length.

Following are some of the features of the SIFT-descriptor. A Gaussian weighting function is used to assign a weight to each pixel where pixels farther away from the corner have less impact on the weight. The Gaussian function decreases boundary effects. That is, gradual changes in location do not result in sudden changes in the descriptor.

The descriptor tolerates small localization errors by using 4×4 sample regions. Because the corners are not located exactly, it is inevitable that locations can incur small shifts over time. This can cause unstable representations for corners in a sequence of frames corresponding to the same background objects in a video sequence. The use of histograms over the 4×4 sample regions effectively alleviates such a negative effect.

Non-linear illumination changes might result in large magnitudes for some gradients. But such changes are less likely to change the gradient orientations. Therefore, the gradient magnitudes are limited by thresholding their values in the unit feature vector. For example, each feature value is limited to 0.2.

The prior art SIFT descriptor was developed for image-matching applications. There, points corresponding to the same object are extracted from images under different scales and views. Hence, that descriptor needs to be scaleable and rotation invariant.

In contrast, the requirements here are quite different. For moving-object detection, corners that are extracted from the same position in the background are under the same scale and rotation over time. Therefore, it is unnecessary to have a multi-scale implementation and orientation alignment, which is a major contributor to the high computation cost of building the prior art SIFT descriptor.

A local 8×8 window is defined around each corner. Then, the gradient orientation and the color information within each window is extracted to form a 256-dimensional feature vector:

$$(v^{orientation}1\text{-}128, v^{red}129\text{-}192, v^{green}193\text{-}256), \quad (3)$$

where the orientation accounts for the first 128 bins, and normalized red and green color values each account for 64 bins.

This descriptor contains relevant information about the local neighborhood of a corner that is clearly superior to that of an individual pixel value. As a result each corner is assigned a descriptor in the form of the above 256-dimensional feature vector.

Corner-Based Modeling and Classification

The next step constructs and maintains a background model 141 over time for effective moving objects detection.

Structure of Model

In a pixel-based background model, each individual image can be represented by a two-dimensional matrix of elements where each element records a history of the changes of the corresponding pixel. The exact information stored in this matrix, such as Gaussian parameters or properties of the predictive models, depends on the specific models used.

In principle, the corner-based model 141 differs from the pixel-based model in two ways. First, for the corner-based model, the image matrix is generally very sparse. Most entries are empty. An entry is added only when a corner occurs at that location. Second, more information is maintained for each matrix entry to monitor the detected corner over time at a particular location.

Figure 2:
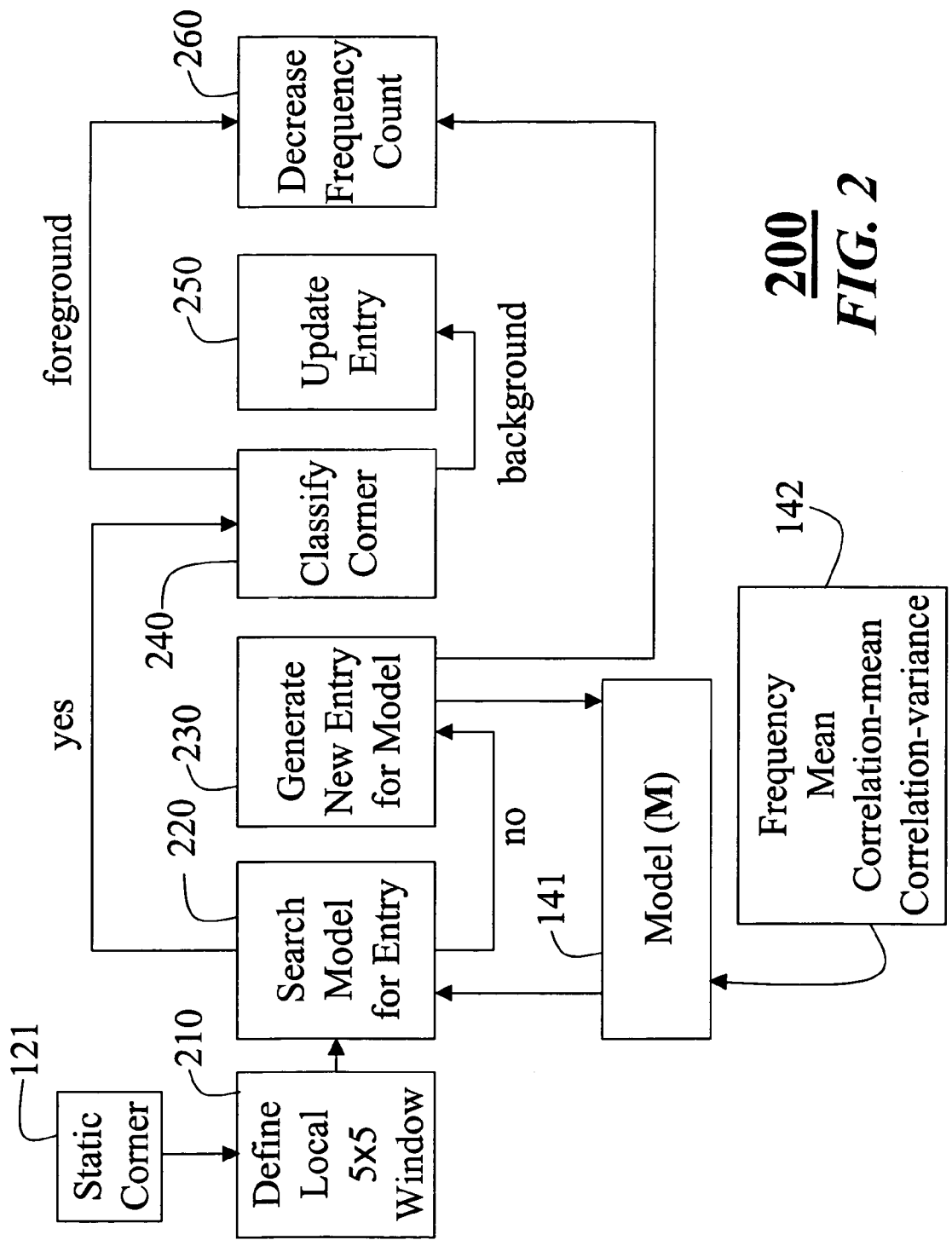
FIG. 2, is a flow diagram for a process for constructing the model and maintaining the model.

As shown in FIG. 2, each matrix entry 142 in the corner-based model 141 includes the following data.

Frequency: A frequency count is incremented when a corner is detected at a particular location in a frame. Moreover, the frequency decreases over time if the corner does not appear, to gradually reduce the effect of previous frames, i.e., the past. That is, the frequency is decremented if a corner is not detected in a frame.

Mean: For corners occurring in the same location over time, a mean vector of the 256-dimensional descriptor is generated. This mean vector compactly encodes the information of a particular location in the background. The mean vector is used to identify a foreground corner.

Correlation: A correlation is defined between pairs of corners. The mean and variance of this correlation also monitored over time. A low correlation indicates that the pair of corners is probably associated with a foreground object 145. The variance is used to apply an adaptive threshold in corner classification.

In the following discussion, this two-dimensional matrix represents the corner-based background model (M) 141. Each model entry M(x, y) records the history of detected corners over time. The entry 142 is a 4-tuple vector N, including frequency, mean, correlation-mean, correlation-variance.

The correlation between a pair of 256-dimensional vectors is defined as:

$$\text{Correlation} = \frac{\sum_i U_i \times V_i}{\sum_i U_i^2 \times V_i^2}, \quad (4)$$

where U and V are the pair of 256-dimensional vectors. Two identical vectors result in maximum correlation of value 1.

Constructing the Model

As shown in FIG. 2, the set of static corners 121 and associated descriptors (features) 131 are used for background modeling and corner classification.

For each detected static corner C 121 at a location (x, y), define 210 a local 5×5 window around the location (x, y).

In this local window, search 220 the model M 141 for an entry 142 with a mean descriptor that has a maximum correlation with the corner under consideration. If there is such an entry M(x', y') go to step 240, otherwise, go to step 230.

Generate 230 a new entry 142 in the model 141, and go to step 260.

Classify 240 the corner as background or foreground based on the correlation value as described above. Go to step 250 if the corner is background, otherwise go to step 260.

Update 250 parameters (frequency, mean, correlation-mean, correlation-variance) in the entry M(x', y') using the current observation, i.e., the local neighborhood of the detected corner C, and do the next corner.

Decrease 260 the frequency for entry M(x, y). If the frequency is zero, then deleted the entry from the model M, and do the next corner.

Instead of using a direct map between locations of entries in the model and the location of the corner, the process uses a local 5×5 window to search for the entry that best matches the corner under consideration. Only background corners are used to update the model. This design allows the model to be used for challenging dynamic scenes, such as ocean waves, changes in the lighting and trees waving in the wind.

Spatial-Temporal Filtering

With the model according to the invention, the foreground corners 'attached' to a 'real' moving object are highly correlated spatially and temporally. In other words, a moving object in a video sequence should be seen as a conjunction of several local observations, i.e., a cluster of foreground corners.

A further way to minimize misclassification of foreground corners is to count the number of the foreground corners around each pixel within a few frames and then use such information to further filter out false foreground corners if the count is less than a predetermined threshold count.

Motion corners as described above, indicate locations of potential moving-objects in a video sequence. In order to increase performance, only those regions in which motion corners 122 exist are considered.

Therefore, the following spatial-temporal filtering 150 is performed. A 10×10 rectangle is placed around each motion corner in five consecutive frames, i.e., the 3D block filter is 10×10×5 pixels. Other values may also be possible. If the number of foreground image corners within the filter is greater than a predetermined threshold, then the moving-object 145 is detected. Otherwise, all the foreground corners in the filter are classified as background corners. Because only motion corners, whose count is usually very small, are considered in the process, this filtering step is very efficient.

Effect of the Invention

Often, dynamic textures exhibit repetitive patterns in the space-time domain. Therefore, conventional techniques model these patterns with a 'pixel-process'. That is, the values of individual pixels are analyzed over time. However, values of individual pixels are more vulnerable to image noise.

The corner-based method according to the invention differs from conventional pixel-based techniques in the following ways. A local neighborhood of pixels is used to represent the background.

Instead of exploiting repetitive patterns of temporal changes, the method according to the invention uses repetitive changes in the spatial domain. For a specific location in a dynamic scene, corners detected over time often encounter small shifts in the spatial domain. For example, a tree leaf waving in the wind may appear in a different location with a deviation of several pixels from the location observed in previous/future frames.

Therefore, the invention does not map directly between the locations of model entries and the corner locations used to construct the model.

Instead, a local 5×5 window is defined to search for a model entry which best matches the corner under consideration.

In addition to its effectiveness in modeling the dynamic scenes, the corner-based background model is highly efficient. Table A compares the results for the multiple Gaussian model of Grimson et al., density estimation according Mittal et al., autoregressive moving average as described by Zhong et al., and the corner-based model according to the invention.

TABLE A

| Methods | Size | Fps |
| --- | --- | --- |
| Multiple Gaussian | 160 × 120 | 13 |
| Density Estimation | 160 × 120 | 7 |
| Autoregressive | 170 × 115 | 0.125 |
| Corner-Based | 352 × 240 | 35 |

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for modeling a background in a sequence of frames of a video, each frame including an array of pixels, comprising:

detecting, for each frame, static corners using the array of pixels;

extracting, for each static corner, features from a window of pixels around the static corner;

determining, for each static corner, a descriptor from the corresponding features;

storing each static corner and corresponding descriptor in a memory; and classifying each static corner as a background or foreground according to the descriptor to model a background in the video.

2. The method of claim 1, further comprising:

subtracting each pair of successive frames to generate motion images;

detecting, for each motion image, motion corners;

filtering, spatially and temporally, the foreground corners according to the motion corners.

3. The method of claim 2, in which a Harris corner detector detects the static corners and motion corners.

4. The method of claim 2, in which a number of static corners is approximately ten times a number of motion corners.

5. The method of claim 2, in which a minimum distance between any two static corners is about five pixels and a minimum distance between any two motion corners is about fifteen pixels.

6. The method of claim 1, in which the features for each static corner form a 256-dimensional vector.

7. The method of claim 6, further comprising:

normalizing the vector to unit length.

8. The method of claim 1, in which the features include gradient orientations and colors of the pixels in the window.

9. The method of claim 1, in which the descriptor includes a frequency that the corner occurs at a particular location in successive frames.

10. The method of claim 9, in which the frequency decreases over time if the corner is not detected in subsequent frames.

11. The method of claim 9, in which the descriptor includes a mean of the descriptor over time.

12. The method of claim 9, further comprising:

determining a correlation between a pair of descriptors, the correlation including a mean and a variance, a relatively low correlation indicating that a particular static corner is classified as the foreground.

13. The method of claim 12, in which a threshold is applied according to the variance to classify the corner.

14. The method of claim 12, in which the correlation is $$\text{Correlation} = \frac{\sum_i U_i \times V_i}{\sum_i U_i^2 \times V_i^2},$$

where U and V are the pair of descriptors.

15. The method of claim 14, in which the correlation is one if the two descriptors are identical.

16. The method of claim 2, in which the filtering counts a number of moving corners in a block of pixels, and deletes the moving corners if the count is less than a predetermined threshold count, and otherwise indicating a moving object.

* * * * *